Figure 3:
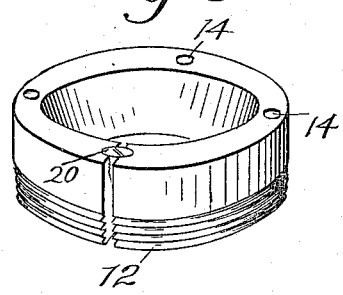

G. C. BARDONS.
TURRET LATHE.
APPLICATION FILED FEB. 19, 1916.

1,224,889.

Patented May 8, 1917.

Inventor
George C. Bardons
by Thurston & Kwis
Attorneys

UNITED STATES PATENT OFFICE.

GEORGE C. BARDONS, OF CLEVELAND, OHIO, ASSIGNOR TO BARDONS AND OLIVER, A PARTNERSHIP COMPRISING GEORGE C. BARDONS AND JOHN G. OLIVER, OF CLEVELAND, OHIO.

TURRET-LATHE.

1,224,889.   Specification of Letters Patent.   Patented May 8, 1917.

Application filed February 19, 1916. Serial No. 79,232.

*To all whom it may concern:*

Be it known that I, GEORGE C. BARDONS, a citizen of the United States, residing at Cleveland, in the county of Cuyahoga and State of Ohio, have invented a certain new and useful Improvement in Turret-Lathes, of which the following is a full, clear, and exact description.

In order that a turret lathe may do accurate work, the turret must be held with its vertical axis always in the same line. But as the turret is turned to present the different tools to the work, the bearings in which the turret turns become worn. When the wear has been sufficient to permit it, the pressure of the work against a tool carried by the turret may be sufficient to slightly move the turret out of alinement. This obviously prevents the machine from doing precise and accurate work.

The present invention aims to keep the turret bearing in condition such that any movement of the axis of the turret will be impossible; or to more precisely state the fact, the object of the present invention is to provide means by which to take up the wear of the bearing of the turret, so that said bearing may be readily put into such condition that any tipping of the turret can not take place.

The invention consists in the construction and combination of parts shown in the drawing and hereinafter described, and definitely pointed out in the appended claims.

Figure 1:
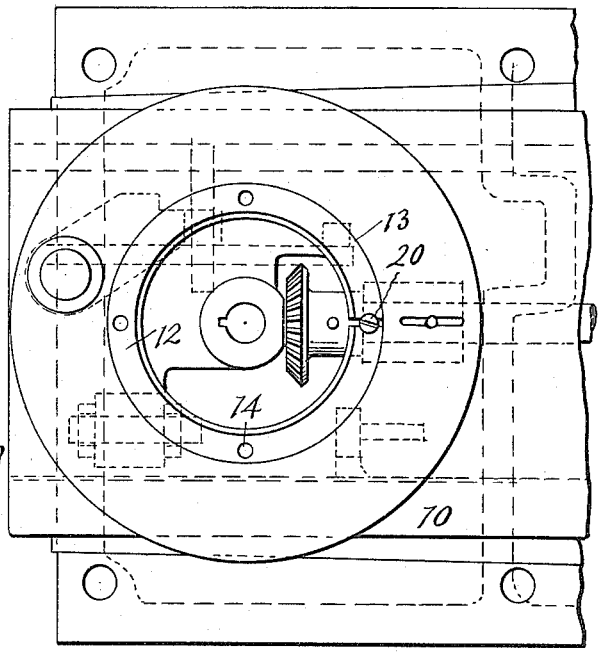
Figure 2:
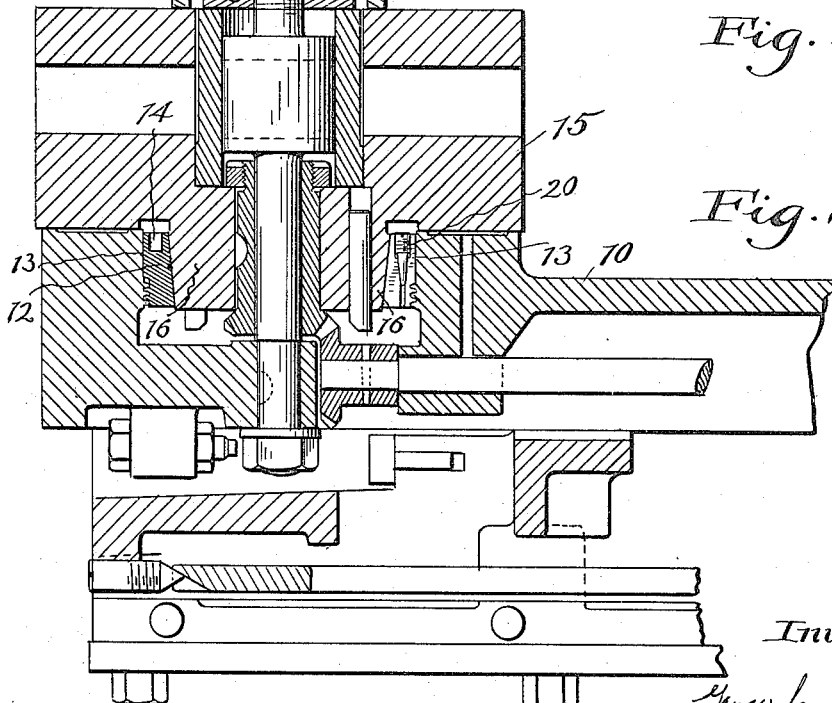

In the drawings, Figure 1 is a plan view of one end of the turret slide with the turret removed; Fig. 2 is a central longitudinal vertical section through the turret and the end of the slide upon which the turret is mounted; Fig. 3 is a perspective view of the split ring 12.

Referring to the parts by reference characters, 10 represents the turret slide of a turret lathe; and 15 the rotatable turret which is carried thereby. This turret is provided with a downwardly extended frusto-conical boss 16. This is rotatably mounted in a ring 12 which is exteriorly threaded, and is screwed into a threaded cylindrical recess 13 in the turret slide. This ring 12 is internally tapered or conical, and it is screwed down to such position that the conical boss 16 will nicely fit therein when said turret is supported upon the top surface of the turret slide around said ring in the usual way.

As soon as there is any indication that the engaging conical surfaces of said ring and boss have become sensibly worn, the turret should be removed, and the ring turned so that it will move upward far enough to make it fit the part of the conical boss 16 with which it will engage when the turret is replaced and again rests upon the top of the turret slide. Holes 14 are formed in the top of this ring for engagement by a spanner wrench by which it may be turned.

This ring 12, as shown, is split, and a hole 12$^a$ is formed in the adjacent edges of said split ring. The upper part of this hole is threaded and the lower part is tapered. A locking pin 20 is screwed into this threaded hole, and this locking pin has a tapered lower end which, as it is forced down into the tapered part of the hole 13$^a$, (as it will be when the locking screw is screwed down) will spread the split ring enough to lock it against turning as the turret is turned.

The other parts shown in the drawing are the ordinary parts associated with the turret of a turret lathe; wherefore, and, for the further reason that they have nothing whatever to do with the present invention, said parts seem to require no description or explanation here.

Having described my invention, I claim:

1. In a turret lathe, the combination of a turret slide having a threaded vertical hole and an upper surface around the same for supporting a turret, an externally threaded and internally conical ring which is screwed into said hole, and a turret which rests upon the slide and has a depending frusto-conical boss which is rotatably fitted in said ring.

2. In a turret lathe, the combination of a turret slide having a threaded vertical hole and an upper surface around the same for supporting a turret, a split ring which is screwed into said hole, means for expanding said split ring when it has been adjusted to the desired position with respect to the turret slide, and a turret which rests upon the slide and has a depending frusto-conical boss which is rotatably fitted in said ring.

3. In a turret lathe, the combination of a turret slide having a threaded vertical hole and an upper surface around the same for supporting a turret, a split ring which is screwed into said hole, said split ring having in its adjacent ends a threaded and tapered hole, and a threaded and tapered locking pin which screws into said hole, a turret which rests upon the slide and has a depending frusto-conical boss which is rotatably fitted in said ring.

In testimony whereof I hereunto affix my signature in the presence of two witnesses.

GEORGE C. BARDONS.

Witnesses:
 M. J. LLOYD,
 H. W. GEORGE.

Copies of this patent may be obtained for five cents each, by addressing the "Commissioner of Patents, Washington, D. C."